(12) United States Patent  
Sasaki et al.

(10) Patent No.: US 8,021,141 B2  
(45) Date of Patent: Sep. 20, 2011

(54) IMPRINT APPARATUS

(75) Inventors: Miho Sasaki, Abiko (JP); Masahiko Ogino, Hitachi (JP); Akihiro Miyauchi, Hitachi (JP); Noritake Shizawa, Ninomiya (JP); Kyoichi Mori, Oiso (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 12/582,732

(22) Filed: Oct. 21, 2009

(65) Prior Publication Data  
US 2010/0098799 A1    Apr. 22, 2010

(30) Foreign Application Priority Data  
Oct. 21, 2008 (JP) .................. 2008-270747

(51) Int. Cl.  
*B29C 59/00* (2006.01)  
*B29C 35/08* (2006.01)

(52) U.S. Cl. ............... 425/385; 425/174.4; 425/384; 425/389; 264/293

(58) Field of Classification Search ............ 425/174.4, 425/384, 385, 389; 264/293  
See application file for complete search history.

(56) References Cited

U.S. PATENT DOCUMENTS

| 5,817,242 A * | 10/1998 | Biebuyck et al. ............ 216/41 |
| 2004/0131718 A1 * | 7/2004 | Chou et al. .................. 425/385 |
| 2006/0246169 A1 * | 11/2006 | Chen et al. ................... 425/385 |

FOREIGN PATENT DOCUMENTS  
JP    2000-194142    7/2000

* cited by examiner

*Primary Examiner* — Maria Veronica Ewald  
(74) *Attorney, Agent, or Firm* — Antonelli, Terry, Stout & Kraus, LLP.

(57) ABSTRACT

An imprint apparatus has a head unit with a fine structure. The head unit includes a fine imprint pattern layer including fine concavities and convexities, a resin layer on a face of the fine imprint pattern layer opposite to a face where the concavities and convexities are formed, a first pressurizing base member on a face of the resin layer opposite to a face contacting the fine imprint pattern layer, and a second pressurizing base member on a face of the first pressurizing base member opposite to a face contacting the resin layer. The resin layer has a modulus of elasticity smaller than that of the fine imprint pattern layer, and the first pressurizing base member has a modulus of elasticity smaller than that of the resin layer. A light source or a heat source may be further provided. The head unit may be light permeable. A replacement layer may be further provided for replacement.

6 Claims, 7 Drawing Sheets

IMPRINT APPARATUS

CROSS REFERENCE TO RELATED APPLICATIONS

This application claims the foreign priority benefit under Title 35, United States Code, §119(a)-(d) of Japanese Patent Application No. 2008-270747, filed on Oct. 21, 2008 in the Japan Patent Office, the disclosure of which is herein incorporated by reference in its entirety.

BACKGROUND OF THE INVENTION

1. Field of the Invention

The present invention relates to an imprint apparatus which transfers fine concavities and convexities on a fine structure to a surface of an object to which a pattern is to be transferred.

2. Description of the Related Art

Conventionally, photolithography techniques are commonly used as techniques which form fine patterns necessary for semiconductor devices or the like. However, as patterns become finer, it becomes difficult to cope with such a refinement by the photolithography techniques if a required process size becomes as small as a wavelength or so of light used in exposure. Accordingly, electron beam drawing devices which are a kind of charged particle beam devices becomes popular instead of the photolithography techniques. Unlike a one-shot exposure technique in a pattern formation using a light source of i-rays, excimer lasers, and the like, a pattern formation using electron beams employs a technique of directly drawing a mask pattern. Accordingly, the larger the number of patterns to be drawn is, the more the exposure (drawing) time increases, and it takes a time to finish a pattern. Therefore, as the integration degree of semiconductor integrated circuits increases, a time necessary for forming a pattern increases, so that the throughput is likely to be degraded. Hence, advanced well to overcome this problem is development of one-shot pattern exposure technique in which various kinds of masks are combined together and irradiated with electron beams at once, and electron beams of a complex shape corresponding to the combination of the masks are formed in order to speed up the electron beam drawing devices. However, as the pattern becomes finer, the electron beam drawing devices become large in size, a highly-precise position control for a mask becomes necessary, and a device cost increases. Conversely, there are known nano-imprinting techniques which can form a highly-precise pattern at low cost. According to the nano-imprinting techniques, a stamper having concavities and convexities (surface shapes) corresponding to concavities and convexities of a pattern to be formed is pressed against an object to which the pattern is to be transferred and which is acquired by forming a resin layer on a predetermined substrate, and a fine pattern can be formed on the resin layer of the transfer object. The nano-imprinting techniques are applied to formation of patterns of recording bits in a large-capacity recording medium, and formation of patterns of a semiconductor integrated circuit.

JP 2000-194142 A discloses a method of transferring an imprint pattern to a quartz substrate.

SUMMARY OF THE INVENTION

An aspect of the present invention provides an imprint apparatus comprising: a head unit comprising: a fine imprint pattern layer including fine concavities and convexities on a surface thereof; a resin layer on the fine imprint pattern layer opposite to the surface; a first pressurizing base member on the resin layer opposite to the fine imprint pattern layer; and a second pressurizing base member on the first pressurizing base member opposite to the resin layer; and a stage configured to hold the object and press the concavities and convexities on the object. The resin layer has a modulus of elasticity smaller than a modulus of elasticity of the fine imprint pattern layer, and the first pressurizing base member has a modulus of elasticity smaller than the modulus of elasticity of the resin layer.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the above-mentioned related art will be further explained.

In the method of transferring the imprint pattern to a quartz substrate disclosed in JP 2000-194142, in which case the quartz substrate which is not elastic, a poor transferring may occur if there is locally a foreign particle on or a projection from a surface of the object to which the imprinting pattern is transferred. Further, the fine structure may be broken because an excessive pressure occurs around the foreign particle or the projection.

The present invention provides an imprint apparatus capable of decreasing a poor transferring area of the fine imprint pattern and avoiding breakage of the fine structure by locally, elastically deformation in accordance with the protrusion due to the projection or the foreign particle.

According to the present invention, the imprint apparatus is provided which is capable of decreasing a poor transferring area of the fine imprint pattern and avoiding breakage of the fine structure by locally, elastically deformation in accordance with the protrusion due to the projection or the foreign particle.

Figure 1:
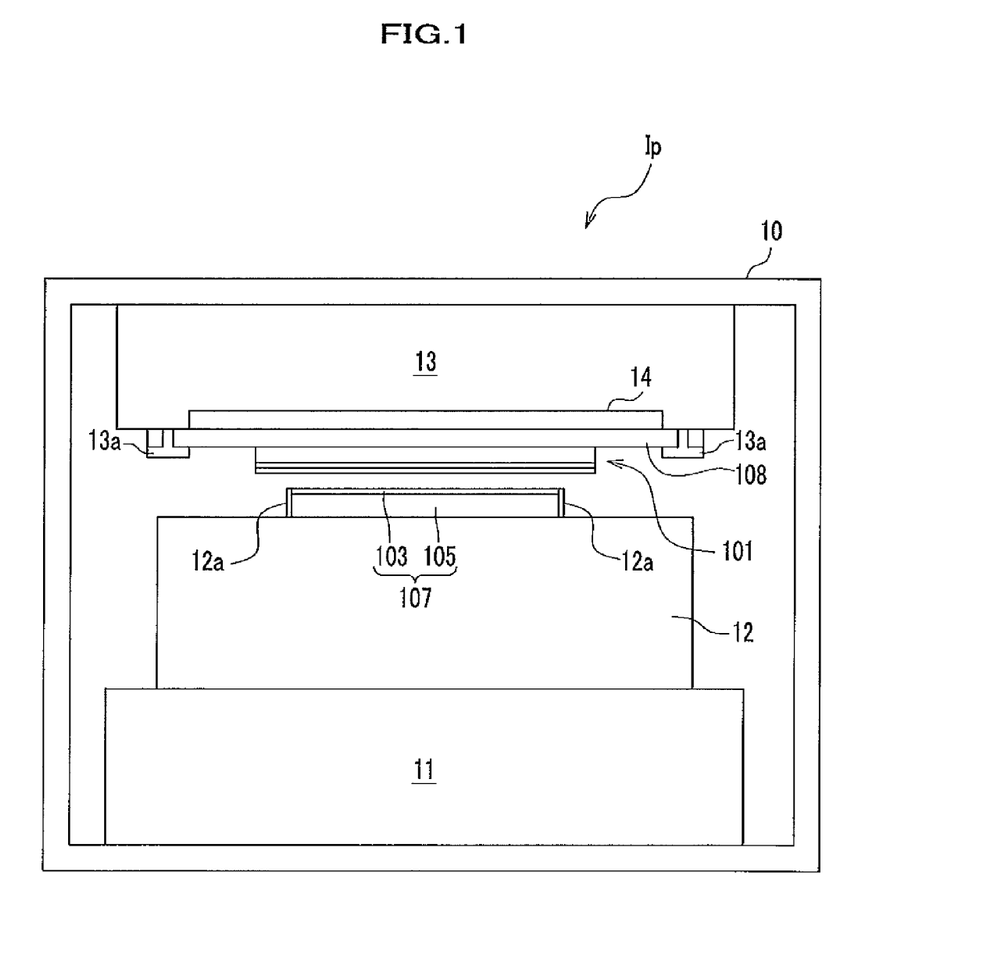
FIG. 1 is a side view of an imprint apparatus according to an embodiment of the present invention.
Figure 2:
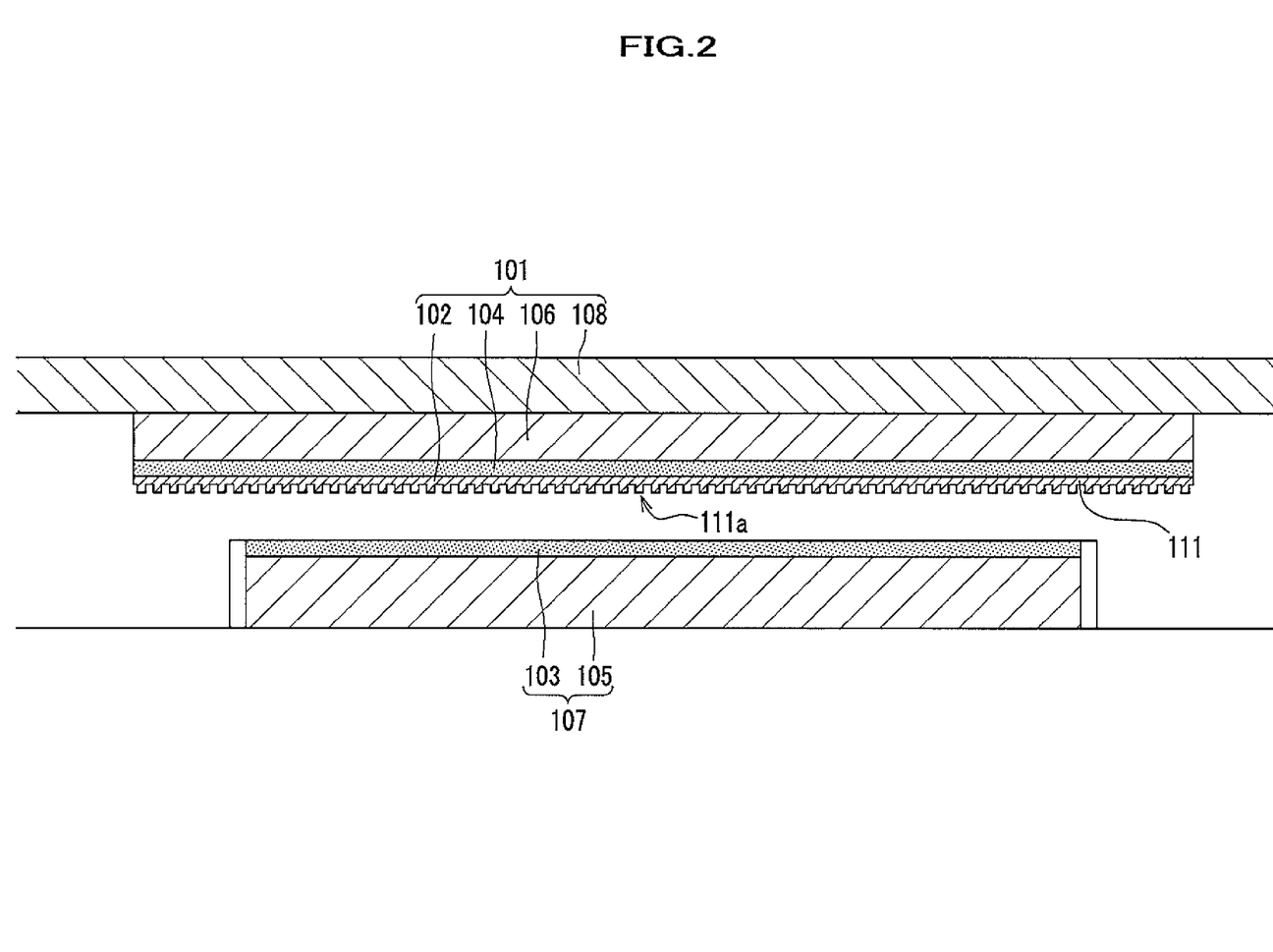
FIG. 2 is a partial enlarged side view of a head unit and a stage of the imprint apparatus.

An explanation will be given of embodiments of an imprint apparatus of the present invention in detail with reference to accompanying drawings. FIG. 1 is a side view of an imprint apparatus according to an embodiment of the present invention. FIG. 2 is a partial enlarged side view of a head unit and a stage of the imprint apparatus.

As shown in FIG. 1, an imprint apparatus Ip of the embodiment comprises a vacuum chamber 10 which serves as a casing, an elevating mechanism 11, a stage 12 which is moved up and down by the elevating mechanism 11 and holds an object 107 to which a pattern is to be formed (hereinafter, "transfer object 107"), and a head unit 101 having a fine structure 111 (see FIG. 2) to be discussed later. The elevating mechanism 11, the stage 12 and the head unit 101 are retained in the vacuum chamber 10.

The elevating mechanism 11 in the embodiment is supported by a bottom of the vacuum chamber 10, and thrust force generated by the elevating mechanism 11 can be adjusted by an electropneumatic regulator (not shown). The elevating mechanism 11 inputs thrust force to the stage 12 through a non-illustrated drive shaft, thereby ascending/descending the stage 12.

The transfer object 107 has a substrate 105, and a transfer resin 103 arranged on a surface of the substrate 105 as a thin film.

The transfer object 107 is not limited to any particular one as far as it can provide a required strength and a process precision, and can be, for example, a silicon wafer, various kinds of metallic materials, a glass, a quartz, a ceramic, and a plastic.

In the embodiment, it is presumed that the transfer resin 103 is a photo-curable resin, but is not limited to this, and can be a thermosetting resin, or a thermoplastic resin.

The transfer object 107 is held on a top face of the stage 12 by a holder 12a so that the transfer resin 103 faces the head unit 101. That is, as the stage 12 is moved up by the elevating mechanism 11, the transfer resin 103 of the transfer object 107 is pushed against the head unit 101.

The head unit 101 is arranged above the stage 12, and is attached to a ceiling of the vacuum chamber 10 via a fixing block 13. More specifically, the head unit 10 is attached to a bottom face of the fixing block 13 by a jig 13a, and the head unit 101 can be replaced with another one by removing the jig 13a.

A light source 14 emitting ultraviolet ray is arranged inside the fixing block 13, and irradiates the transfer object 107 with ultraviolet through the head unit 101. In the embodiment, the head unit 101 has a light permeability, in particular, an ultraviolet ray permeability as will be discussed later.

In the embodiment, the head unit 101 is formed in a circular shape as viewed from the top, but the planar shape as viewed from the top is not limited to any particular one, and can be an elliptical shape, a polygonal shape, and the like. The head unit 101 is provided with a non-illustrated center hole.

As shown in FIG. 2, the head unit 101 has a fine imprint pattern layer 102, a resin layer 104, a first pressurizing base member 106, and a second pressurizing base member 108 in this order from a side facing the transfer resin 103 of the transfer object 107 to the top. In the embodiment, the head unit 101 has the fine imprint pattern layer 102, the resin layer 104, and the first pressurizing base member 106 with the same diameter, and the second pressurizing base member 108 has a larger diameter than the head unit 101 has the fine imprint pattern layer 102, the resin layer 104. As shown in FIG. 1, the head unit 101 is supported by the second pressurizing base member 108 relative to the fixing block 13.

In the imprint apparatus Ip of the embodiment, the resin layer 104 has a smaller modulus of elasticity than that of the fine imprint pattern layer 102, and the first pressurizing base member 106 has a smaller modulus of elasticity than that of the resin layer 104.

As shown in FIG. 2, the fine imprint pattern layer 102 has a fine structure 111 which is to be transferred to the transfer resin 103 of the transfer object 107. The fine structure 111 comprises a fine pattern 111a which is fine concavities and convexities in a nanometer order. Note that in FIG. 2, concavities and convexities of the fine structure 111 are enlarged to facilitate drawing (the same is true of figures following FIG. 2).

The fine imprint pattern layer 102 is formed of a material which does not cause any plastic deformation of the concavities and convexities formed on a surface of such a layer due to pressurization at the time of transferring.

Examples of the material of the fine imprint pattern layer 102 are a phenol resin, a urea resin, a melamine resin, polyethylene terephthalate, unsaturated polyester, an alkyd resin, a vinylester resin, an epoxy resin, polyimide, polyurethane, polycarbonate, polystyrene, an acrylic resin, polyamide, an ABS resin, an AS resin, an AAS resin, polyvinyl alcohol, polyethylene, polypropylene, polytetrafluoroethylene, polyarylate, a cellulose acetate resin, polyethylene naphthalate, polybuthylene terephthalate, polyphenylene sulfide, polyphenylene oxide, cycloolefin polymer, polyactate, a silicon resin, and a diallyl phthalate resin. Those materials may be used individually, or plural materials may be selected from those, and may be mixed together. Moreover, those materials may contain a filler like an organic filler or an inorganic filler as far as it can maintain a light permeability.

Regarding the thickness of the fine imprint pattern layer 102, it is desirable that the maximum thickness at a convexity of the fine pattern should be greater than or equal to 100 nm, and should be less than or equal to 10 µm. Making this thickness greater than or equal to 100 nm surely ensures the anti-pressurization characteristic at the time of transferring. Moreover, making the thickness less than or equal to 10 µm results in surely reduction of a transfer-failed region Lc (see FIG. 4) to be discussed later.

A fluorinated or silicon releasing treatment can be performed on a surface of the fine imprint pattern layer 102 in order to promote releasing of the transfer resin 103 and the head unit 101. Moreover, a thin film of a metallic compound may be formed on the surface of the fine imprint pattern layer 102 as a release layer.

The resin layer 104 is an elastic layer formed between the fine imprint pattern layer 102 and the first pressuring base member 106 to be discussed next, and is formed of a material having a smaller modulus of elasticity than that of the fine imprint pattern layer 102, and having a wide elastic deformation region at a room temperature. Note that a modulus of elasticity means a Young's modulus in the embodiment.

Regarding a material of the resin layer 104, a material having a smaller modulus of elasticity than that of the fine imprint pattern layer 102 is selected from a following group.

That is, examples of such a material of the resin layer 104 are a phenol resin, a urea resin, a melamine resin, polyethylene terephthalate, unsaturated polyester, an alkyd resin, a vinylester resin, an epoxy resin, polyimide, polyurethane, polycarbonate, polystyrene, an acrylic resin, polyamide, an ABS resin, an AS resin, an AAS resin, polyvinyl alcohol, polyethylene, polypropylene, polytetrafluoroethylene, polyarylate, a cellulose acetate resin, polyethylene naphthalate, polybuthylene terephthalate, polyphenylene sulfide, polyphenylene oxide, cycloolefin polymer, polyactate, a silicon resin, a diallyl phthalate resin, a nitrile rubber, a polybutadiene rubber, an acrylic rubber, and a silicon rubber. Those materials may be used individually, or plural materials may be selected from those, and may be mixed together. Moreover, those materials may contain a filler like an organic filler or an inorganic filler as far as it can maintain a light permeability.

The first pressurizing base member 106 is an elastic layer formed between the resin layer 104 and the second pressurizing base member 108 to be discussed next, and has a smaller modulus of elasticity than that of the resin layer 104. A material of the first pressurizing base member 106 is selected from materials having a smaller modulus of elasticity than that of the resin layer 104. The material of the first pressuring base member 106 can be selected from the example materials of the resin layer 104, but a viscoelastic body is desirable. Examples of such viscoelastic body are a silicon gel and silicon oil. Note that when the material of the first pressuring base member 106 is a fluent material, such material is encapsulated in a predetermined encapsulation container, and the "modulus of elasticity" of this material is a bulk modulus in this case.

The second pressurizing base member 108 is fixed to the fixing block 13 as explained above, and has a larger modulus of elasticity than that of the first pressuring base member 106. That is, the second pressurizing base member 108 is formed of a material having a larger modulus of elasticity than that of the material of the first pressurizing base member 106 so that it can be appropriate for a pressure adjustment at the time of imprinting, an alignment and a carrying in an imprinting step.

Note that it is desirable that the modulus of elasticity of the second pressurizing base member 108 is larger than that of the resin layer 104.

Examples of the material of the second pressurizing base member 108 are a glass and a resin. The second pressurizing base member 108 may be a multilayer structure having greater than or equal to two kinds of materials stacked together, and a metal layer, a resin layer, an oxide film layer or the like may be formed on a surface of the multilayer structure at a light permeable thickness.

As explained above, it is presumed that the head unit 101 has a light permeability in the embodiment, but when the transfer resin 103 of the transfer object 107 is not a photo-curable resin, i.e., is a thermosetting resin or a thermoplastic resin, the head unit 101 may not be light permeable. In this case, the material of the fine imprint pattern layer 102 may be a metal which can give flexibility. Specific examples of such a metal are copper, iron, nickel, and alloys, such as nickel-phosphorous, nickel-manganese, nickel-iron, nickel-cobalt, cobalt-molybdenum, cobalt-tungsten, nickel-molybdenum, and nickel-tungsten.

In the head unit 101 having no light permeability, the second pressurizing base member 108 may be formed of a silicon, or a metal like aluminum.

Next, an explanation will be given of a working and an effect of the imprint apparatus Ip of the embodiment while explaining a transfer method using the imprint apparatus Ip. FIGS. 3A to 3D are diagrams exemplary showing steps of the transfer method using the imprint apparatus of the embodiment.

Figure 3A:
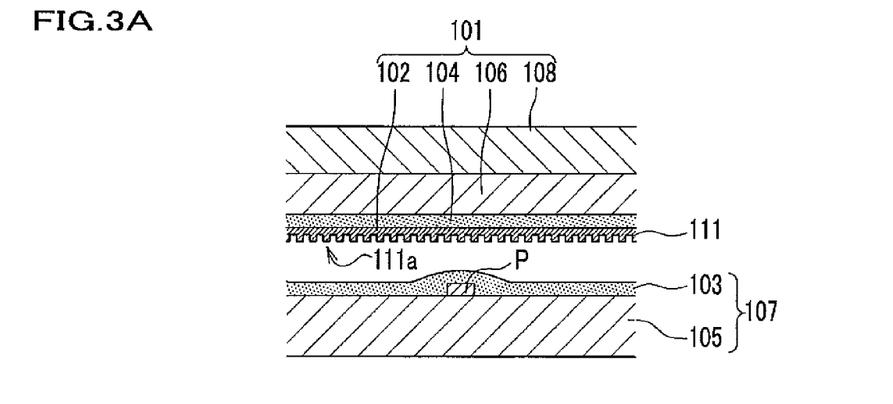
FIGS. 3A to 3D are diagrams exemplary showing steps of a transfer method using the imprint apparatus of the embodiment.

FIG. 3A shows a status before the fine structure is transferred. As shown in FIG. 3A, before the fine pattern 111a of the fine structure 111 of the head unit 101 is transferred to the transfer resin 103 of the transfer object 107, the fine pattern 111a and the transfer resin 103 are spaced apart from each other. The resin layer 104, the first pressurizing base member 106, and the second pressurizing base member 108 are stacked together in this order above the fine imprint pattern layer 102 where the fine pattern 111a is formed, and as explained above, modulus of coefficient becomes small in the order of the fine imprint pattern layer 102, the resin layer 104, and the first pressurizing layer 106.

Note that a reference numeral 105 denotes the substrate in FIG. 3A, and a symbol P denotes a protrusion inevitably present on the substrate 105 and embedded in the transfer resin 103.

Figure 3B:
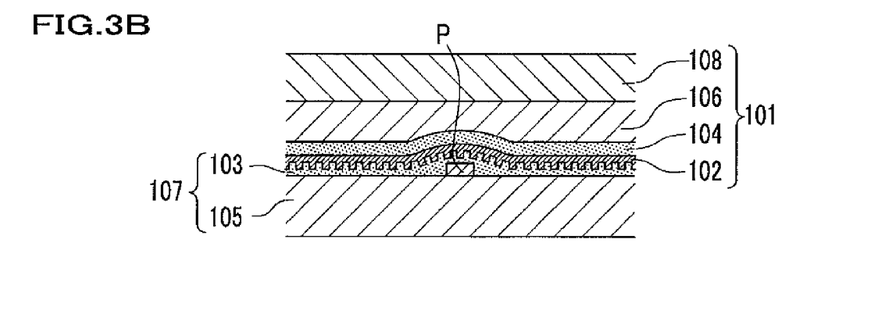

As shown in FIG. 3B, in a pressurizing/transferring step that the transfer object 107 is pressed against the head unit 101b and the fine pattern 111a (see FIG. 3A) is transferred to the transfer resin 103, the head unit 101 deforms so as to correspond to the shape of the protrusion P. This deformation is caused because the modulus of elasticity of the resin layer 104 is smaller than that of the fine imprint pattern layer 102 and the modulus of elasticity of the first pressurizing base member 106 is further smaller than that of the resin layer 104.

More specifically, when the resin layer 104 having a better elasticity (having a smaller modulus of elasticity) than the fine imprint pattern layer 102 deforms correspondingly to the shape of the protrusion P, the first pressurizing base member 106 having a further higher elasticity (having a smaller modulus of elasticity) than the resin layer 104 presses the surroundings of the protrusion P from the above by its weight, so that the head unit 101 deforms correspondingly to the shape of the protrusion P. That is, a silicon oil or a silicon gel also having a fluidity is particularly preferable as the material of the first pressurizing base member 106 because the correspondence characteristic becomes superior due to an effect of gravitational pressure.

Next, with the transfer object 107 being pressed (being pressurized) against the head unit 101 by the elevating mechanism 11, the light source 14 (see FIG. 1) irradiates the transfer resin 103 with ultraviolet, so that the transfer resin 103 formed of a photo-curable resin starts curing. As a result, the fine pattern 111a is transferred to the transfer resin 103.

Next, according to the transfer method of the embodiment, as the stage 12 is moved down by the elevating mechanism 11 shown in FIG. 1, the transfer object 107 is removed from the head unit 101. Thereafter, as shown in FIG. 3C, when the transfer resin 103 of the transfer object 107 is released from the fine imprint pattern layer 102 of the head unit 101, the head unit 101 is concaved correspondingly to the shape of the protrusion P.

Figure 3C:
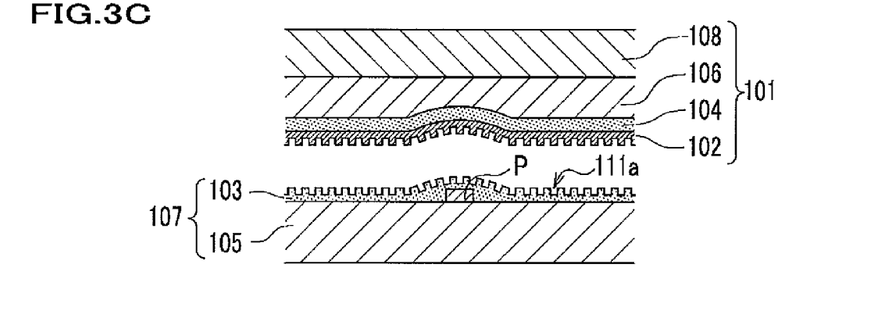
Figure 3D:
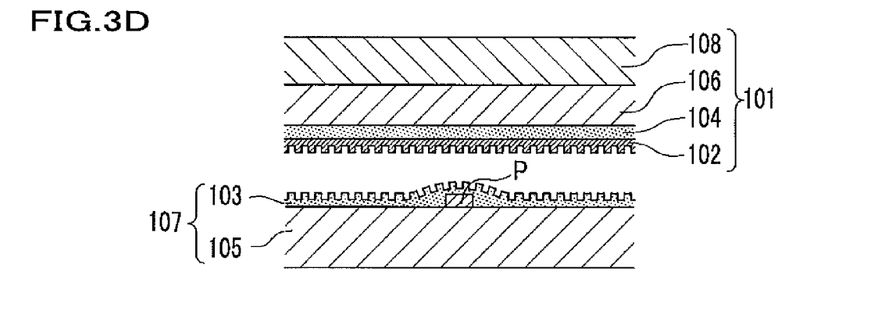

As shown in FIG. 3D, at a flatness recovering time after a predetermined time has elapsed from when the transfer object 107 is removed from the head unit 101, the concaved shape of the head unit 101 shown in FIG. 3C is recovered to the original flat shape because of elastic forces of the fine imprint pattern layer 102, the resin layer 104, and the second pressurizing base member 108.

Figure 4:
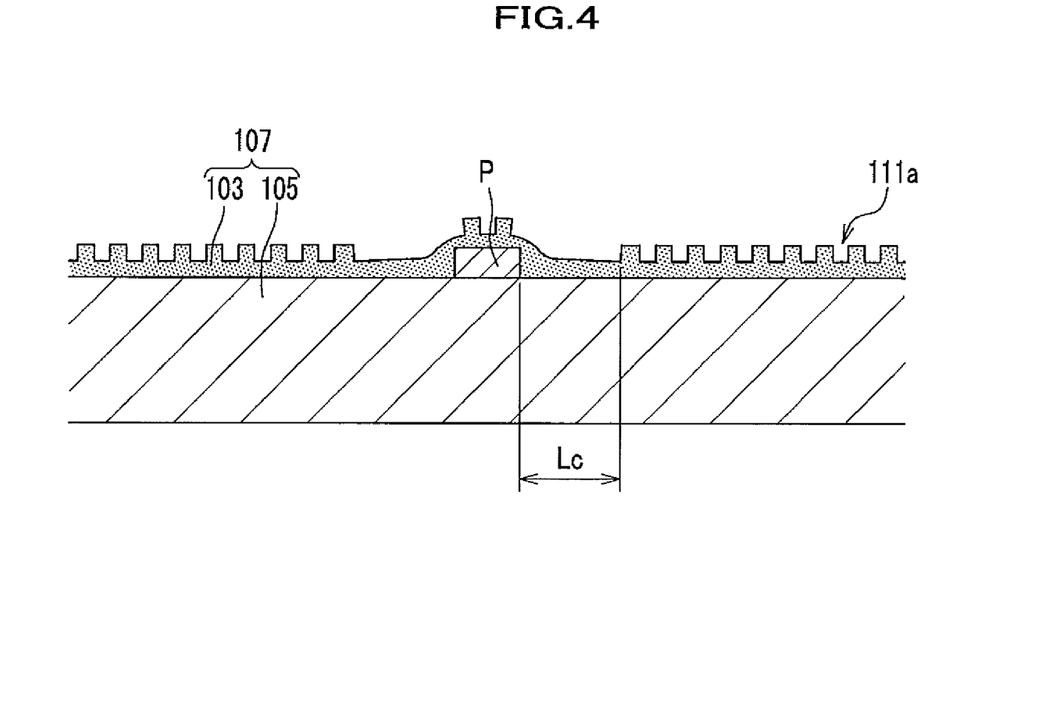
FIG. 4 is a sectional view for explaining a transfer-failed region Lc.

According to the transfer method of the embodiment, as explained above, because the head unit 101 deforms correspondingly to the shape of the protrusion P, the fine pattern 111a (see FIG. 3C) is formed on a region of the transfer resin 103 where the protrusion P is present and on surrounding regions thereof. That is, a region where transferring of the fine pattern 111a is failed is reduced in the transfer object 107. FIG. 4 is an exemplary diagram for explaining a transfer-failed region.

As shown in FIG. 4, a transfer-failed region Lc is a substantially-circular region where the fine pattern 111a is not formed around the protrusion P, and can be expressed by a distance between an end of the protrusion P and an outer periphery of the substantial circle. The transfer-failed region Lc is mainly produced when the head unit 101 does not deform well correspondingly to the shape of the protrusion P at the time of pressurizing/transferring step shown in FIG. 3B. When the head unit 101 does not deform correspondingly to the shape of the protrusion P, the transfer-failed region Lc shown in FIG. 4 is produced because a surface of the fine imprint pattern layer 102 (see FIG. 3A) does not reach a surface of the transfer resin 103 (see FIG. 3A) around the protrusion P.

Conversely, as shown in FIG. 3B, the head unit 101 of the embodiment deforms correspondingly to the shape of the protrusion P, so that production of a transfer-failed region Lc can be suppressed as much as possible.

As explained above, the imprint apparatus Ip of the embodiment having the head unit 101 can cope with a local protrusion P on the substrate 105 to reduce a transfer-failed region Lc of the fine pattern 111a, and can suppress any breakage of the fine structure 111.

According to the imprint apparatus Ip, because it is possible to reduce the transfer-failed region Lc as much as possible, the transfer object 107 to which the fine structure 111 is transferred can be used as an information recording medium, such as a magnetic recording medium, and an optical recording medium. Moreover, the transfer object 107 can be used as a large-scale integrated circuit part, a lens, a polarization plate, a wavelength filter, a light emitting element, an optical part of an optical integrated circuit, and a biotechnology device for immune assay, DNA separation, cell culturing, and the like.

The present invention is not limited to the foregoing embodiment, and can be changed and modified in various forms. An explanation will be given of other embodiments of the present invention with reference to the accompanying drawings. FIGS. 5 to 8 are exemplary diagrams for explaining a head unit according to another embodiment. Note that the same elements as those of the first embodiment will be denoted by the same reference numerals, and detailed explanation thereof will be omitted.

Figure 5:
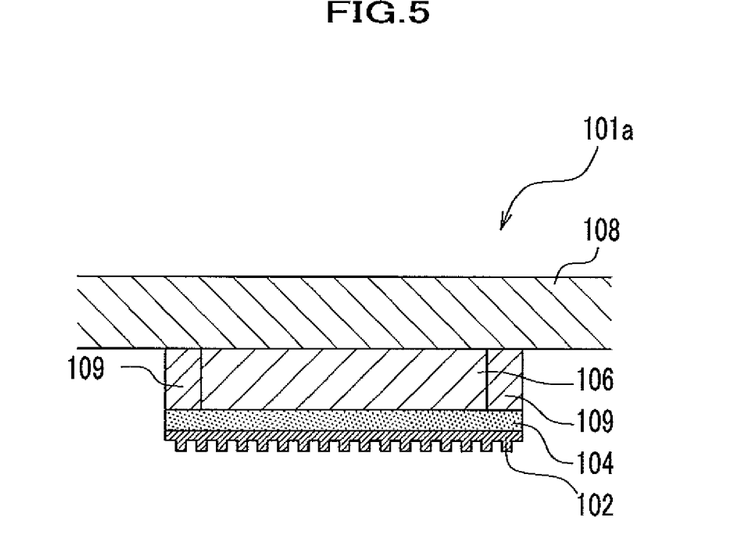
FIG. 5 is a sectional view for explaining a head unit according to another embodiment of the present invention.

As shown in FIG. 5, a head unit 101a of another embodiment has a frame 109. The frame 109 is an annular member having substantially same outer diameter as that of the resin layer 104 having a circular planer shape, and is arranged between the resin layer 104 and the second pressurizing base member 108. A material of the frame 109 is not limited to any particular one, but an elastic body like a silicon rubber is desirable.

As the first pressurizing base member 106 is arranged inside the frame 109, the head unit 101a has the resin layer 104, the first pressurizing base member 106, and the second pressuring base member 108 over the fine imprint pattern layer 102 in this order.

Note that the first pressurizing base member 106 arranged inwardly of the frame 109 may be a solid substance, or one having a fluidity like a silicon oil. When the first pressurizing base member 106 having the fluidity is used, the frame 109 corresponds to the foregoing encapsulation container.

Figure 6A:
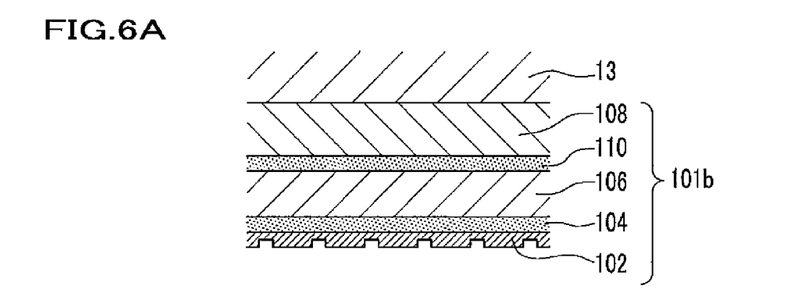
FIGS. 6A and 6B are sectional views of a head unit for explaining the head unit according to the other embodiment of the present invention.

As shown in FIG. 6A, a head unit 101b of the other embodiment has a replacement layer 110 between the first pressurizing base member 106 and the second pressurizing base member 108. The replacement layer 110 separably joins the first pressurizing base member 106 and the second pressurizing base member 108 together. Examples of a material of the replacement layer 110 are a resin, and a metal.

A method of joining the first pressuring base member 106 and the second pressuring base member 108 together by the replacement layer 110 is not limited to any particular one as far as those members are separable, and, for example, a technique of joining those members together by a bond, an adhesive, and the like, and a technique of joining those member together by fastening means like a bolt and a clip can be used.

Note that the material of the replacement layer 110 may be a bonding resin, an adhesive resin or the like which can join the first pressurizing base member 106 and the second pressurizing base member 108 together itself.

Figure 6B:
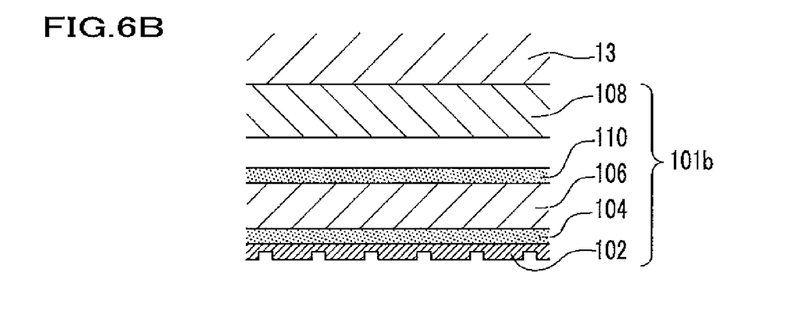

According to the head unit 101b having such a replacement layer 110, as shown in FIG. 6B, because the first pressurizing base member 106 and the second pressurizing base member 108 are separable from each other, as explained above, it is possible to replace the fine imprint pattern layer 102 without detaching the second pressurizing base member 108 fixed to the fixing block 13. That is, parts of the head unit 101b from the fine imprint pattern layer 102 to the replacement layer 110 are replaceable.

As shown in FIG. 6B, in addition to separation of the replacement layer 110 from the second pressurizing base member 108, the head unit 101b may employ a structure that the first pressurizing base member 106 is separable from the second pressurizing base member 108 while leaving the replacement layer 110 at the second pressurizing base member 108 in order to reuse the replacement layer 110 formed of, for example, an adhesive resin for predetermined times. That is, "a part from the fine imprint pattern layer 102 to the replacement layer 110 is replaceable" includes a case in which the replacement layer 110 is reused a predetermined number of times and then replaced in a future.

Figure 7A:
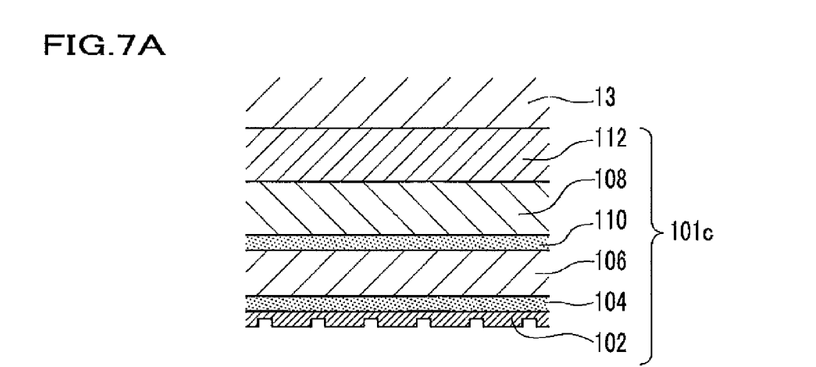
FIGS. 7A and 7B are sectional views of the head unit for explaining a head unit according to the further other embodiment of the present invention.

As shown in FIG. 7A, a head unit 101c of further other embodiment has the replacement layer 110 between the first pressurizing base member 106 and the second pressurizing base member 108 like the head unit 101b shown in FIG. 6A. Unlike the head unit 101b, however, the head unit 101c further has a holding member 112 between the fixing block 13 and the second pressurizing base member 108. The holding member 112 is fixed to the fixing block 13, and detachably holds the second pressurizing base member 108.

A material of such holding member 112 can be one having a predetermined strength like a resin, a metal, and is not limited to any particular one.

A method of joining the holding member 112 to the second pressurizing base member 108 is not limited to any particular technique as far as the second pressurizing base member 108 is separable, and examples of such a technique is joining by an adhesive or a bond, and joining using fastening means like a bolt and a clip.

Figure 7B:
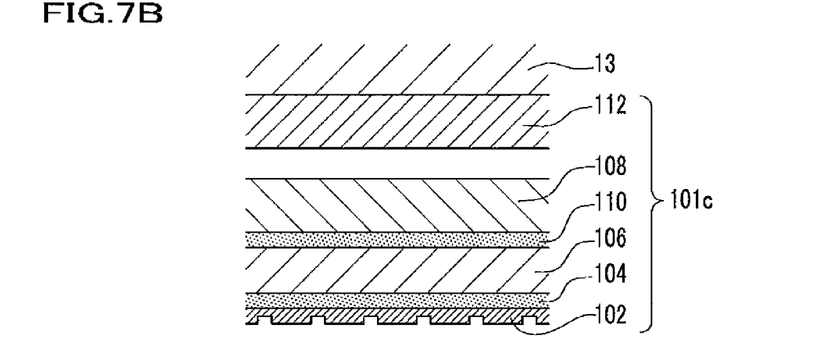

According to the head unit 101c having such a holding member 112, as shown in FIG. 7B, because the second pressurizing base member 108 and the holding member 112 are separable, it is possible to replace the fine imprint pattern layer 102.

Figure 8:
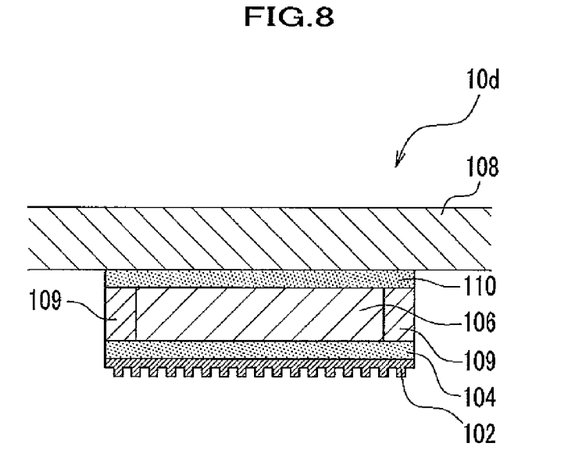
FIG. 8 is a sectional view of the head unit for explaining a head unit according to yet other embodiment of the present invention.

As shown in FIG. 8, a head unit 101d of yet other embodiment basically has the same structure as that of the head unit 101a shown in FIG. 5 except that it has the replacement layer 110 between the first pressuring base member 106 arranged inside the frame 109 and the second pressurizing base member 108. The replacement layer 110 is same as the replacement layer 110 shown in FIG. 6A.

According to the head unit 101d having such a replacement layer 110, because the first pressurizing base member 106 and the second pressurizing base member 108 are separable, as explained above, it is possible to replace the fine imprint pattern layer 102 without detaching the second pressurizing base member 108 fixed to the fixing block 13.

In other words, the head unit 101 comprises the fixing block 13 configured to support the second pressurizing base member 108 and a replacement layer 110 (112) therein having such a peel strength that a first part of the head unit 101 including the fine imprint pattern layer 102 is separable from a second part of the head unit 101 including the fixing block 13 to replace the fine imprint pattern layer 102.

In the foregoing embodiments, although the transfer resin 103 of the transfer object 107 is formed of a photo-curable resin and the head unit 101 has a light permeability, the transfer resin 103 of the transfer object 107 may be formed of a resin other than the photo-curable resin, like a thermosetting resin or a thermoplastic resin. When the transfer resin 103 is formed of a resin other than the photo-curable resin, it is unnecessary that the head unit 101 has a light permeability.

Figure 11:
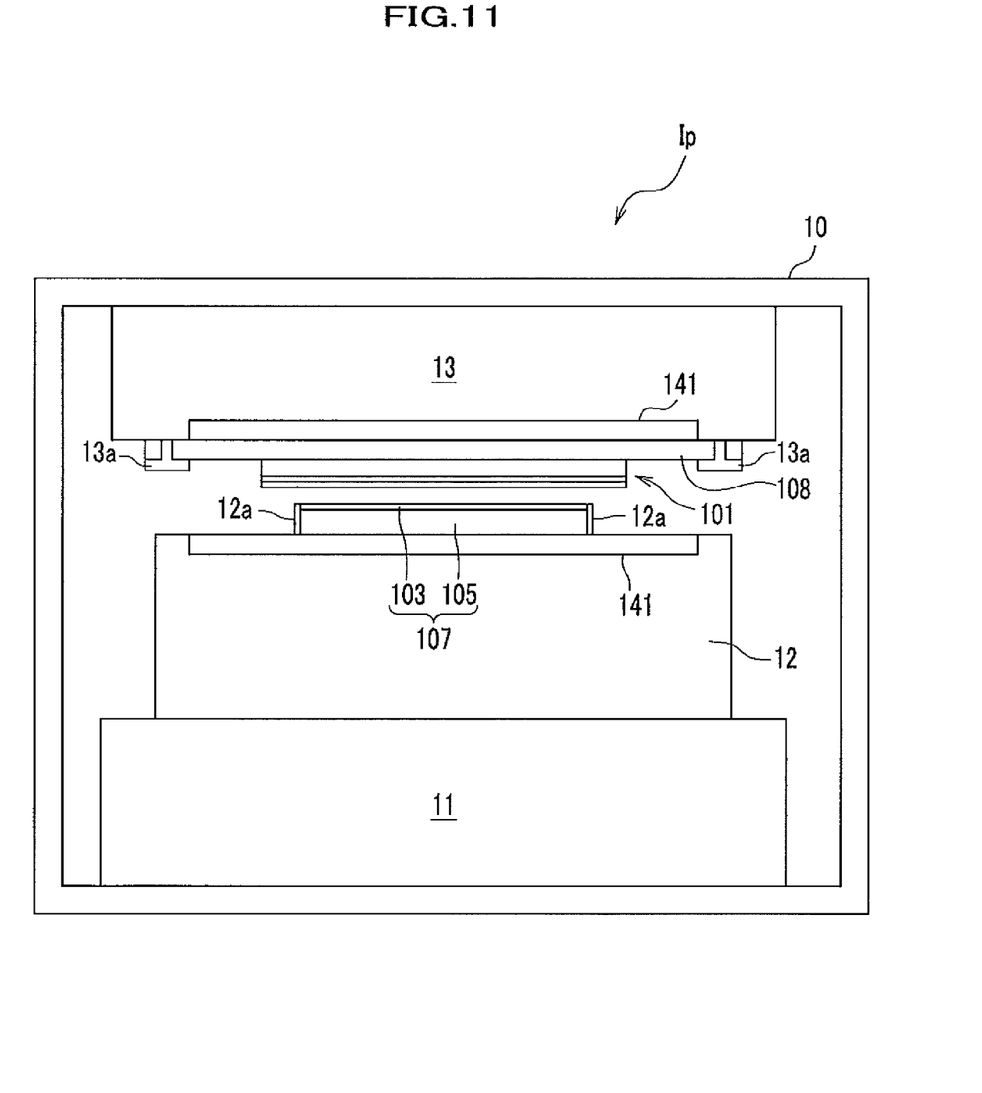
FIG. 11 is a side view of an imprint apparatus according to a modification of the present invention.

When the transfer resin 103 is formed of a thermosetting resin or a thermoplastic resin, it is desirable that the imprint apparatus Ip should have a heating source 141 (see FIG. 11) which heats up the transfer object 107, instead of the light source 14.

According to the imprint apparatus Ip of this structure, after the transfer resin 103 formed of a thermosetting resin is pressed against the head unit 101, as the heating source heats up the transfer resin 103, the transfer resin 103 starts curing, thereby transferring the fine pattern.

Moreover, according to the imprint apparatus Ip which uses the transfer resin 103 formed of a thermoplastic resin, the heating source heats up the thermoplastic resin at a temperature beyond the glass-transition temperature (Tg). As a result, the transfer resin 103 plasticizes, and as the head unit 101 is pressed against the transfer resin 103, the fine pattern is transferred to the transfer resin 103.

It is desirable to further or solely arrange such a heating source 141 at the stage 12 where the transfer object 107 is disposed. The heating source 141 may be further provided at the fixing block 13 where the head unit 101 is arranged.

The imprint apparatus Ip may further has a cooling mechanism which cools down the transfer resin 103 heated by the heating source.

In the foregoing embodiments, the transfer object 107 is pressed against the head unit 101 as the stage 12 is moved up by the elevating mechanism 11, but the imprint apparatus Ip may employ a structure that the fixing block 13 is moved down by a predetermined drive mechanism to press the head unit 101 against the transfer object 107.

EXAMPLES

Next, the present invention will be explained in more detail with reference to examples.

First Example

In the first example, an imprint apparatus having the head unit 101a shown in FIG. 5 was used, and a fine pattern was transferred to a transfer object.

Photo-curable unsaturated polyester was applied on a discoid silicon-made master mold (diameter: 100 mm) having a groove pattern (fine pattern) with a width of 50 nm, a depth of 80 nm, and a pitch of 100 nm by spin coating. The unsaturated polyester was cured by ultraviolet, so that a fine imprint pattern layer 102 having substantially same diameter as that of the master mold with a thickness of 1 μm was formed on the master mold. The modulus of elasticity (Young's modulus) of the fine imprint pattern layer 102 was 2.4 GPa.

Next, a photo-curable low-modulus epoxy resin was applied on the fine imprint pattern layer 102 on the master mold by spin coating. The low-modulus epoxy resin was cured, so that a resin layer 104 having substantially same diameter as that of the master mold with a thickness of 5 μm was formed on the fine imprint pattern layer 102. The modulus of elasticity (Young's modulus) of the resin layer 104 was 10 MPa.

Next, an annular frame 109 formed of a silicon rubber was bonded on the resin layer 104. The frame 109 had substantially same outer diameter as that of the resin layer 104, an inner diameter of the frame 109 was 80 mm, and a thickness thereof was 100 μm. A silicon gel was poured inside the frame 109. The poured silicon gel was heated for 30 minutes at 70° C. and cured. Accordingly, a first pressurizing base member 106 having a thickness of 100 μm was formed. The modulus of elasticity (Young's modulus) of the first pressurizing base member 106 was 3 kPa.

Next, a quartz glass was disposed on the first pressurizing base member 106, and the quartz glass and the frame 109 were bonded together, so that a second pressurizing base member 108 formed of a quartz glass was formed on the first pressurizing base member 106. The modulus of elasticity (Young's modulus) of the second pressurizing base member 108 was 72 GPa. Thereafter, the master mold was removed from the fine imprint pattern layer 102, thereby obtaining the head unit 101a shown in FIG. 5.

Next, an imprint apparatus Ip shown in FIG. 1 having the head unit 101a (see FIG. 5) of the first example as the head unit 101 was used to transfer the groove pattern (fine pattern) of the head unit 101a to the transfer object 107.

As the transfer object 107, one having a size of 20 mm by 200 mm, a thickness of 1 mm and having a photo-curable transfer resin 103 applied on a silicon substrate 105 was used.

There was a protrusion (see FIG. 3A) having a height of 1 μm present on the substrate 105.

Using the imprint apparatus Ip, the transfer resin 103 of the transfer object 107 was pressed against the head unit 101a (see FIG. 5), and the transfer resin 103 was cured by ultraviolet from the light source 14 (see FIG. 1), so that as shown in FIG. 4, the transfer object 107 having the transfer resin 103 to which the fine pattern 111a was transferred was acquired.

A transfer-failed region Lc (see FIG. 4) of the acquired transfer object 107 was checked, and the transfer-failed region was 17 μm. Moreover, a surface of the fine imprint pattern layer 102 (see FIG. 5) of the head unit 101a was observed after the fine pattern 111a was transferred, and no breakage was found.

Those results are shown in table 1.

Note that absence of breakage of the head unit 101a is indicated by a circle in table 1.

TABLE 1

| | | FIRST EXAMPLE | SECOND EXAMPLE |
|---|---|---|---|
| SECOND PRESSURIZING BASE MEMBER | MODULUS OF ELASTICITY (Pa) | $7.2 \times 10^{10}$ | $7.2 \times 10^{10}$ |
| | THICKNESS (μm) | 400 | 400 |
| FIRST PRESSURIZING BASE MEMBER | MODULUS OF ELASTICITY (Pa) | $3.0 \times 10^{3}$ | $2.2 \times 10^{9}$ |
| | THICKNESS (μm) | 100 | 100 |
| RESIN LAYER | MODULUS OF ELASTICITY (Pa) | $1.0 \times 10^{7}$ | $1.0 \times 10^{7}$ |
| | THICKNESS (μm) | 5 | 5 |
| FINE IMPRINT PATTERN LAYER | MODULUS OF ELASTICITY (Pa) | $2.4 \times 10^{9}$ | $2.4 \times 10^{9}$ |
| | THICKNESS (μm) | 1 | 1 |
| HEIGHT OF PROTRUSION P (μm) | | 1 | 1 |
| TRANSFER-FAILED REGION Lc (μm) | | 17 | 15 |
| PRESENCE/ABSENCE OF BREAKAGE OF SURFACE OF HEAD UNIT AFTER TRANSFER | | ○ | ○ |

Second Example

In the second example, in the head unit 101a shown in FIG. 5, a silicon oil was used as the first pressurizing base member 106 arranged inside the frame 109 instead of a cured silicon gel. Other structures were same as those of the first example. The modulus of elasticity (bulk modulus) was 2.2 GPa.

Next, an imprint apparatus Ip shown in FIG. 1 having the head unit 101a (see FIG. 5) of the second example as the head unit 101 was used to transfer the groove pattern (fine pattern) of the head unit 101a to the same transfer object 107 as that of the first example.

A transfer-failed region Lc (see FIG. 4) of the transfer object 107 where the fine pattern 111a was transferred was checked, and the transfer-failed region Lc was 15 μm. A surface of the fine imprint pattern layer 102 (see FIG. 5) of the head unit 101a was observed after the fine pattern 111a was transferred, and no breakage was found.

Those results are shown in table 1.

First Comparative Example

Figure 9:
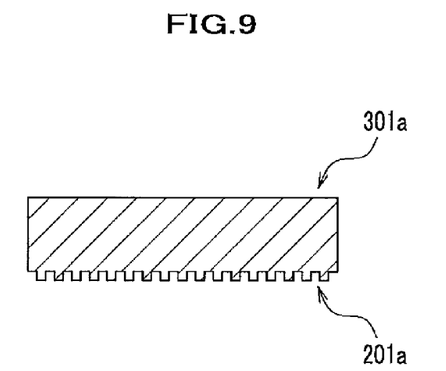
FIG. 9 is a sectional view of a head unit used in a first comparative example.

In the first comparative example, a head unit 301a to be discussed below was used instead of the head unit 101a, but a groove pattern (fine pattern) was transferred to the same transfer object 107 as that of the first example. FIG. 9 is an exemplary diagram for explaining a head unit used in the first comparative example.

As shown in FIG. 9, the head unit 301a used in the first comparative example had a quartz glass having a diameter of 100 μm, and a thickness of 10 μm, and a fine pattern 201a formed on a surface of the quartz glass ("fine pattern formation part" in table 2). The fine pattern 201a was a groove pattern having a width of 50 nm, a depth of 80 nm, and a pitch of 100 nm. The modulus of elasticity (Young's modulus) of the fine pattern formation part was 72 GPa.

Next, an imprint apparatus Ip shown in FIG. 1 having the head unit 301a (see FIG. 9) of the first comparative example as the head unit 101 was used to transfer the fine pattern 201a of the head unit 301a to the same transfer object 107 as that of the first example.

A transfer-failed region Lc (see FIG. 4) of the transfer object 107 where the fine pattern 201a was transferred was checked, and the transfer-failed region LC was 200 μm. Moreover, a surface of the pattern formation part of the head unit 301a was observed after the fine pattern 201a was transferred, and a breakage of the fine pattern 201a was found.

Those results are shown in table 2.

Note that presence of a breakage of the head unit 301a is indicated by a cross mark in table 2.

TABLE 2

|  |  | FIRST COMPARATIVE EXAMPLE | SECOND COMPARATIVE EXAMPLE |
| --- | --- | --- | --- |
| BASE MEMBER | MODULUS OF ELASTICITY (Pa) | — | $7.2 \times 10^{10}$ |
|  | THICKNESS (μm) | — | 10 |
| FINE PATTERN FORMATION PART | MODULUS OF ELASTICITY (Pa) | $7.2 \times 10^{10}$ | $1.6 \times 10^{9}$ |
|  | THICKNESS (μm) | 10 | 3 |
| HEIGHT OF PROTRUSION P (μm) |  | 1 | 1 |
| TRANSFER-FAILED REGION Lc (μm) |  | 200 | 196 |

TABLE 2-continued

|  | FIRST COMPARATIVE EXAMPLE | SECOND COMPARATIVE EXAMPLE |
| --- | --- | --- |
| PRESENCE/ABSENCE OF BREAKAGE OF SURFACE OF HEAD UNIT AFTER TRANSFER | x | x |

Second Comparative Example

Figure 10:
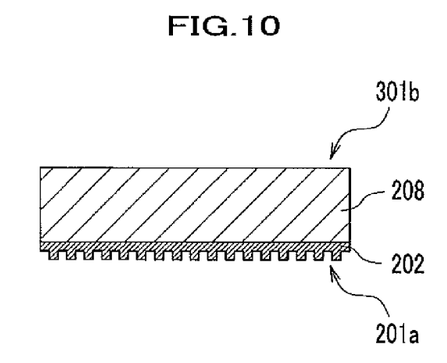
FIG. 10 is a sectional view of a head unit used in a second comparative example.

In the second comparative example, a head unit 301b to be discussed below was used instead of the head unit 101a, but a groove pattern (fine pattern) was transferred to the same transfer object 107 as that of the first example. FIG. 10 is an exemplary diagram for explaining a head unit used in the second comparative example.

As shown in FIG. 10, the head unit 301b used in the second comparative example had a base member 208 formed of a quartz glass having a diameter of 100 μm and a thickness of 10 μm, and a fine pattern formation part 202 formed of a cured polyvinyl alcohol and having a thickness of 3 μm, and the fine pattern formation part 202 was formed on a surface of the base member 208. A fine pattern 201a which was a groove pattern having a width of 50 μm, a depth of 80 nm, and a pitch of 100 nm was formed at the fine pattern formation part 202.

The modulus of elasticity (Young's modulus) of the base member 208 was 72 GPa, and the modulus of elasticity of the fine pattern formation part 202 was 1.6 GPa.

Next, an imprint apparatus Ip shown in FIG. 1 having the head unit 301b (see FIG. 10) of the second comparative example as the head unit 101 was used to transfer the fine pattern 201a of the head unit 301b to the same transfer object 107 as that of the first example.

A transfer-failed region Lc (see FIG. 4) of the transfer object 107 where the fine pattern 201a was transferred was checked, and the transfer-failed region LC was 196 μm. Moreover, a surface of the pattern formation part of the head unit 301b was observed after the fine pattern 201a was transferred, and a breakage of the fine pattern 201a was found.

Those results are shown in table 2.

Evaluation for Imprint Apparatus of Examples and Comparative Examples

The imprint apparatus of the first and second examples has the head unit 101a comprising the fine imprint pattern layer 102, the resin layer 104, the first pressurizing base member 106, and the second pressurizing base member 108 all stacked together in this order. As shown in table 1, the modulus of elasticity becomes small in the order of the fine imprint pattern layer 102, the resin layer 104, and the first pressurizing base member 106, so that the head unit 101a can deform correspondingly to the shape of the protrusion P even if the transfer object 107 has the tiny protrusion P.

Conversely, according to the imprint apparatus of the first and second comparative examples, unlike the first and second examples, because the head unit 301a, 301b does not have the fine imprint pattern layer 102, the resin layer 104, and the first pressurizing base member 106, as shown in table 2, the head unit cannot deform correspondingly to the shape of the protrusion P.

Therefore, according to the imprint apparatus of the first and second examples, unlike the imprint apparatus of the first and second comparative examples, because the head unit 101a can deform correspondingly to the shape of the protrusion P on the transfer object 107, it is possible to reduce the transfer-failed region Lc of the fine pattern, and to suppress any breakage of the fine structure 111.

Third Example

In the third example, an imprint apparatus Ip having the head unit 101d (see FIG. 8) as the head unit 101 was used to transfer the groove pattern (fine pattern) of the head unit 101d to the transfer object 107.

The head unit 101d (see FIG. 8) of the third example had the same fine imprint pattern layer 102, resin layer 104, frame 109, and first pressurizing base member 106 as those of the head unit 101a (see FIG. 5) of the first example. The modulus of elasticity (Young's modulus) of the fine imprint pattern layer 102 was 2.4 GPa, the modulus of elasticity (Young's modulus) of the resin layer 104 was 10 MPa, and the modulus of elasticity (Young's modulus) of the first pressurizing base member 106 was 3 kPa.

In the third example, a PET sheet which was going to function as the replacement layer 110 (see FIG. 8) was fixed closely on the first pressurizing base member 106 (see FIG. 8) by adhesion force of a cured silicon gel, and a quartz glass which was going to function as the second pressurizing base member 108 (see FIG. 8) was bonded thereon by a bond formed of a photo-curable resin, and the master mold was removed from the fine imprint pattern layer 102 like the first example, thereby finishing the head unit 101d.

The modulus of elasticity (Young's modulus) of the second pressurizing base member 108 in the third example was 72 GPa.

Next, an imprint apparatus Ip shown in FIG. 1 having the head unit 101d (see FIG. 8) of the third example as the head unit 101 was used to transfer the groove pattern (fine pattern) of the head unit 101d to the same transfer object 107 as that of the first example. At this time, the transfer object 107 was pressurized at 0.1 MPa against the head unit 101d.

A transfer-failed region Lc (see FIG. 4) of the transfer object 107 where the fine pattern 111a was transferred was checked, and the transfer-failed region Lc was 27 µm. A surface of the fine imprint pattern layer 102 (see FIG. 8) of the head unit 101d was observed after the fine pattern 111a was transferred, and no breakage was found.

Next, in the third example, as explained above, after the groove pattern (fine pattern) of the head unit 101d was transferred to the transfer object 107, as shown in FIG. 6B, the replacement layer 110 and the second pressurizing base member 108 closely bonded together by the bond were separated from each other. That is, the fine imprint pattern layer 102, the resin layer 104, the frame 109, the first pressurizing base member 106, and the replacement layer 110 shown in FIG. 8 were separated from the second pressurizing base member 108.

Thereafter, newly prepared fine imprint pattern layer 102, resin layer 104, frame 109, first pressurizing base member 106, and replacement layer 110 were bonded to the second pressurizing base member 108 by a bond, so that parts of the head unit 101d other than the second pressurizing base member 108 were replaced.

Fourth Example

Prepared in the fourth example was a head unit 101c (see FIG. 7A) in which a holding member 112 (see FIG. 7A) was provided on an upper face of the second pressurizing base member 108, i.e., a face opposite to a face on which the replacement layer 110 was provided in the structure of the head unit 101d (see FIG. 8) of the third example. The holding member 112 of the fourth example was formed of a glass, and was light permeable. The holding member 112 was arranged between the fixing block 13 and the second pressurizing base member 108 in an imprint apparatus Ip shown in FIG. 1. More specifically, the holding member 112 of the fourth example was fixed to the fixing block 13 by means of bolt (not shown). The holding member 112 vacuum-chucked the second pressurizing base member 108, and holding it while grasping the side faces thereof.

In the head unit 101c (see FIG. 7A) of the fourth example, the modulus of elasticity (Young's modulus) of the fine imprint pattern layer 102 was 2.4 GPa, the modulus of elasticity (Young's modulus) of the resin layer 104 was 10 MPa, and the modulus of elasticity (Young's modulus) of the first pressurizing base member 106 was 3 kPa.

Next, an imprint apparatus Ip shown in FIG. 1 having the head unit 101c (see FIG. 7) of the fourth example as the head unit 101 was used to transfer the groove pattern (fine pattern) of the head unit 101c to the same transfer object 107 as that of the first example. At this time, the transfer object 107 was pressurized at 0.1 MPa against the head unit 101d.

A transfer-failed region Lc (see FIG. 4) of the transfer object 107 where the fine pattern 111a was transferred was checked, and the transfer-failed region Lc was 27 p.m. A surface of the fine imprint pattern layer 102 (see FIG. 8) of the head unit 101c was observed after the fine pattern 111a was transferred, and no breakage was found.

Next, in the fourth example, as explained above, after the groove pattern (fine pattern) of the head unit 101c was transferred to the transfer object 107, as shown in FIG. 7B, the holding member 112 and the second pressurizing base member 108 were separated from each other.

Thereafter, new fine imprint pattern layer 102, resin layer 104, first pressurizing base member 106, replacement layer 110, and the second pressurizing base member 108 were prepared, and the second pressurizing base member 108 was fixed to the holding member 112 by a bond and bolts, so that parts of the head unit 101c other than the holding member 112 were replaced.

The invention claimed is:
1. An imprint apparatus comprising:
 a head unit comprising:
  a fine imprint pattern layer including fine concavities and convexities on on a surface thereof;
  a resin layer on the fine imprint pattern layer opposite to the surface;
  a first pressurizing base member on the resin layer opposite to the fine imprint pattern layer, comprising a viscoelastic material with fluidity;
  a second pressurizing base member on the first pressurizing base member opposite to the resin layer;
  a frame between the resin layer and the second pressurizing base member, configured to ecncapsulate the first pressuring base member therein; and
 a stage configured to hold an object and press the concavities and convexities on the object, wherein
the resin layer has a modulus of elasticity smaller than a modulus of elasticity of the fine imprint pattern layer, and the first pressurizing base member has a modulus of elasticity smaller than the modulus of elasticity of the resin layer.

2. The imprint apparatus according to claim 1, wherein the second pressurizing base member has a modulus of elasticity larger than the modulus of elasticity of the first pressurizing base member.

3. The imprint apparatus according to claim 1, further comprising a light source configured to irradiate the object with light through the head unit.

4. The imprint apparatus according to claim 1, further comprising a heating source configured to heat up the object.

5. The imprint apparatus according to claim 3, wherein the head unit is ultraviolet permeable.

6. The imprint apparatus according to claim 1, wherein the head unit further comprises a fixing block configured to support the second pressurizing base member and a replacement layer therein having such a peel strength that a first part of the head unit including the fine imprint pattern layer is separable from a second part of the head unit including the fixing block to replace the fine imprint pattern layer.

* * * * *